United States Patent
Evans (10) Patent No.: US 10,867,201 B2
(45) Date of Patent: Dec. 15, 2020

(54) DETECTING SENSOR OCCLUSION WITH COMPRESSED IMAGE DATA

(71) Applicant: Waymo LLC, Mountain View, CA (US)

(72) Inventor: Ruffin Evans, Cambridge, MA (US)

(73) Assignee: Waymo LLC, Mountain View, CA (US)

( * ) Notice: Subject to any disclaimer, the term of this patent is extended or adjusted under 35 U.S.C. 154(b) by 88 days.

(21) Appl. No.: 16/248,096

(22) Filed: Jan. 15, 2019

(65) Prior Publication Data

US 2020/0226403 A1    Jul. 16, 2020

(51) Int. Cl.
| G06K 9/20 | (2006.01) |
| G06T 7/00 | (2017.01) |
| H04N 5/247 | (2006.01) |
| H04N 5/232 | (2006.01) |
| G01S 17/88 | (2006.01) |
| G01S 13/88 | (2006.01) |

(52) U.S. Cl.
CPC ............ *G06K 9/209* (2013.01); *G06T 7/0002* (2013.01); *H04N 5/23229* (2013.01); *H04N 5/247* (2013.01); *G01S 13/88* (2013.01); *G01S 17/88* (2013.01); *G06T 2207/30168* (2013.01)

(58) Field of Classification Search
CPC .... G06K 9/209; H04N 5/23229; H04N 5/247; G06T 7/0002; G06T 2207/30168; G01S 13/88; G01S 17/88
See application file for complete search history.

(56) References Cited

U.S. PATENT DOCUMENTS

| 6,002,794 A | 12/1999 | Bonneau et al. |
| 2014/0293079 A1* | 10/2014 | Milanfar ............. H04N 5/2171 348/222.1 |
| 2015/0146026 A1 | 5/2015 | Walker et al. |
| 2015/0163400 A1* | 6/2015 | Geiss .................. H04N 5/2258 348/231.99 |
| 2017/0193641 A1 | 7/2017 | Cheng |
| 2017/0345129 A1* | 11/2017 | Doshi .................... H04N 5/247 |
| 2018/0160071 A1 | 6/2018 | Ahn et al. |
| 2018/0174306 A1 | 6/2018 | Edpalm et al. |
| 2018/0260654 A1* | 9/2018 | Cho .......................... G06T 7/12 |

FOREIGN PATENT DOCUMENTS

| JP | 2015126441 A | 7/2015 |
| WO | 2014165472 A1 | 10/2014 |

OTHER PUBLICATIONS

International Search Report and Written Opinion for PCT/US2020/013293 dated May 11, 2020.

* cited by examiner

*Primary Examiner* — Neil R McLean
(74) *Attorney, Agent, or Firm* — Botos Churchill IP Law (57) ABSTRACT

The technology relates to detecting possible imaging sensor occlusion. In one example, a system including an imaging sensor and one or more processors may be configured to capture first image data using the imaging sensor. The one or more processors may encode the first image data into an uncompressed image file and generate a compressed image file based on the uncompressed image file. The file size of the compressed image file may be determined and based on the file size of the compressed image file, the system may determine that the imaging sensor is possibly occluded.

20 Claims, 8 Drawing Sheets

DETECTING SENSOR OCCLUSION WITH COMPRESSED IMAGE DATA

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc.

While sensors for autonomous vehicles may come in many different configurations, as an example, these sensors may include imaging sensors such as LIDAR sensors, radar units, sonar systems, cameras, etc. In the camera example, in addition to configuration, the cameras have various features such as gain, exposure time, etc. which must be set to particular values in order to obtain useful images in different lighting conditions. However, in some instances, it may be possible for a camera to be unable to capture a useful image because the camera's lens is completely or partially occluded.

BRIEF SUMMARY

One aspect of the disclosure provides a method for detecting possible imaging sensor occlusion, the method includes: capturing first image data using the imaging sensor; encoding, by one or more processors, the first image data into an uncompressed image file; generating, by the one or more processors, a compressed image file based on the uncompressed image file; determining, by the one or more processors, a file size of the compressed image file; and determining, by the one or more processors, based on the file size of the compressed image file, that the imaging sensor is possibly occluded.

In one example, the method the file size of the compressed image file is compared to a threshold file size, and determining that the imaging sensor is occluded further includes determining the file size of the compressed image file meets the threshold file size. In some instances, determining the threshold file size based on an average file size of compressed image files generated by one or more imaging sensors known to not have an occlusion. In some instances, determining the threshold file size based on the smallest file size of a compressed image captured during a training period by the imaging sensor, wherein the training period corresponds to a predefined number of frames or a predefined time period. In some instances, determining the threshold file size based on a running average file size of a set of compressed image files generated by the imaging sensor. In some examples, the threshold file size is within a predefined range of the running average file size. In some instances, determining the threshold file size based on compressed image files corresponding to image data captured at a similar time and/or location of the first image data. In some instances, subsequent to determining that the imaging sensor is occluded, adjusting the threshold file size in response to receiving input that the imaging sensor is not occluded.

In some examples, the method further includes generating one or more additional compressed image files based on additional image data captured subsequent to the first image data, determining a file size of the one or more additional image files, and wherein determining the imaging sensor is occluded is further based on the file size of the one or more additional images. In some instances, the method further includes determining a rate of change between the file size of the compressed image and the file size of the one or more additional image files, wherein determining the imaging sensor is occluded further includes determining the rate of change is below a threshold value.

In some examples, the method includes sending a signal to activate a cleaning system in order to clean the imaging sensor based on the determination that the imaging sensor is occluded.

In some examples, the imaging sensor is attached to a vehicle having an autonomous driving mode, and the method further comprises using the determination to control the vehicle in the autonomous driving mode.

In some examples, the imaging sensor is a LIDAR sensor, radar unit, or camera.

Another aspect of the technology is directed to a system for detecting possible imaging sensor occlusion. The system may include an imaging sensor and one or more processors, wherein the one or more processors are configured to: capture first image data using the imaging sensor, encode the first image data into an uncompressed image file, generate a compressed image file based on the uncompressed image file, determine a file size of the compressed image file, and determine based on the file size of the compressed image file, that the imaging sensor is possibly occluded.

In some examples, the one or more processors are further configured to compare the file size of the compressed image file to a threshold file size, and wherein determining that the imaging sensor is occluded further includes determining the file size of the compressed image file meets the threshold file size. In some instances, the one or more processors are further configured to determine the threshold file size based on an average file size of compressed image files generated by one or more imaging sensors known to not have an occlusion.

In some examples, the one or more processors are further configured to determine the threshold file size based on the smallest file size of a compressed image captured during a training period by the imaging sensor, wherein the training period corresponds to a predefined number of frames or a predefined time period. In some instances, the one or more processors are further configured to determine the threshold file size based on a running average file size of a set of compressed image files generated by the imaging sensor. In some instances, the one or more processors are further configured to determine the threshold file size based on compressed image files corresponding to image data captured at a similar time and/or location of the first image data.

In some examples, the imaging sensor is a LIDAR sensor, RADAR unit, or camera.

DETAILED DESCRIPTION

Overview

This technology relates to tracking the data size of compressed images captured by an imaging sensor, such as LIDAR sensors, radar units, sonar systems, cameras, etc., to detect sensor occlusion. Understanding when an imaging sensor, such as a camera, is occluded may be especially useful in situations where critical decisions are made in real time using such images, such as in the case of autonomous vehicles which use imaging sensors to make driving decisions. However, it can be very difficult to determine occlusion of an imaging sensor based on image data alone. For instance, images captured by one camera may be compared with images captured by another camera to determine whether the images captured by the two cameras are the same and/or nearly the same. In the event the images are different, the difference may be the result of one of the cameras being occluded by an object, such as dirt, mud, dust, rain, detritus (e.g., a plastic bag, napkin, etc.), a leaf, a scratch on a lens and/or housing, etc. However, such comparisons generally require at least one redundant camera capable of capturing a similar image to another camera. In addition, the redundant system may require significant processing resources and time to process the images and determine whether they are the same.

For instance, an imaging sensor may include a lens which focuses light towards an image sensor which is attached to a controller which can process information from the image sensor. The image sensor and/or a processor may generate image data which may be encoded into an uncompressed image file. The uncompressed image file may be converted into a compressed image file by compressing the uncompressed file with a compression algorithm.

The compressed image file may be indicative of whether the imaging sensor which captured the image data corresponding to the compressed image file was occluded. In this regard, compressed image files which have a file size that meets (i.e., is larger, smaller, and/or equals) a threshold value may be identified as possibly containing an occlusion. The threshold value may be a threshold file size. Alternatively, or in addition to determining whether the compressed image file meets a threshold value, other techniques, such as statistical time-series analysis and/or machine-learning methods may be used to detect anomalous changes in the file size of the compressed images that could correspond to the presence of an occlusion of the imaging sensor which captured the images.

The features described herein may allow for the detection of whether an imaging sensor is observing something dark or simply occluded using a simple yet effective analysis and thereby improving the operation of the imaging sensor. This determination may be made in real time, for instance, by processors of the imaging sensor or remote processing devices. Thus, the functionality of the imaging sensor can be self-assessed or automatically assessed and used to determine whether to clean the imaging sensor and/or notify a human operator. This can be especially useful in certain situations where the occlusion cannot be easily identified from a visual inspection by a human operator, for instance, because imaging sensor is not easily accessible or no human operator is available. Similarly, as noted above, this technology is also useful in situations where critical decisions are made in real time using such images, such as in the case of autonomous vehicles which use imaging sensor images to make driving decisions. In addition, since many visual processing systems already compress raw image files for storage and processing, the bulk of the processing required to perform the occlusion analysis described herein may already occur. As such, occlusion detection does not require much additional processing from what is already performed by the systems. In addition, the techniques discussed herein do not require a particular model or theory for the type of occlusion. As such, these techniques are applicable to many types of occlusions, including those not previously detectable by imaging sensor systems.

Example Systems

Figure 1:
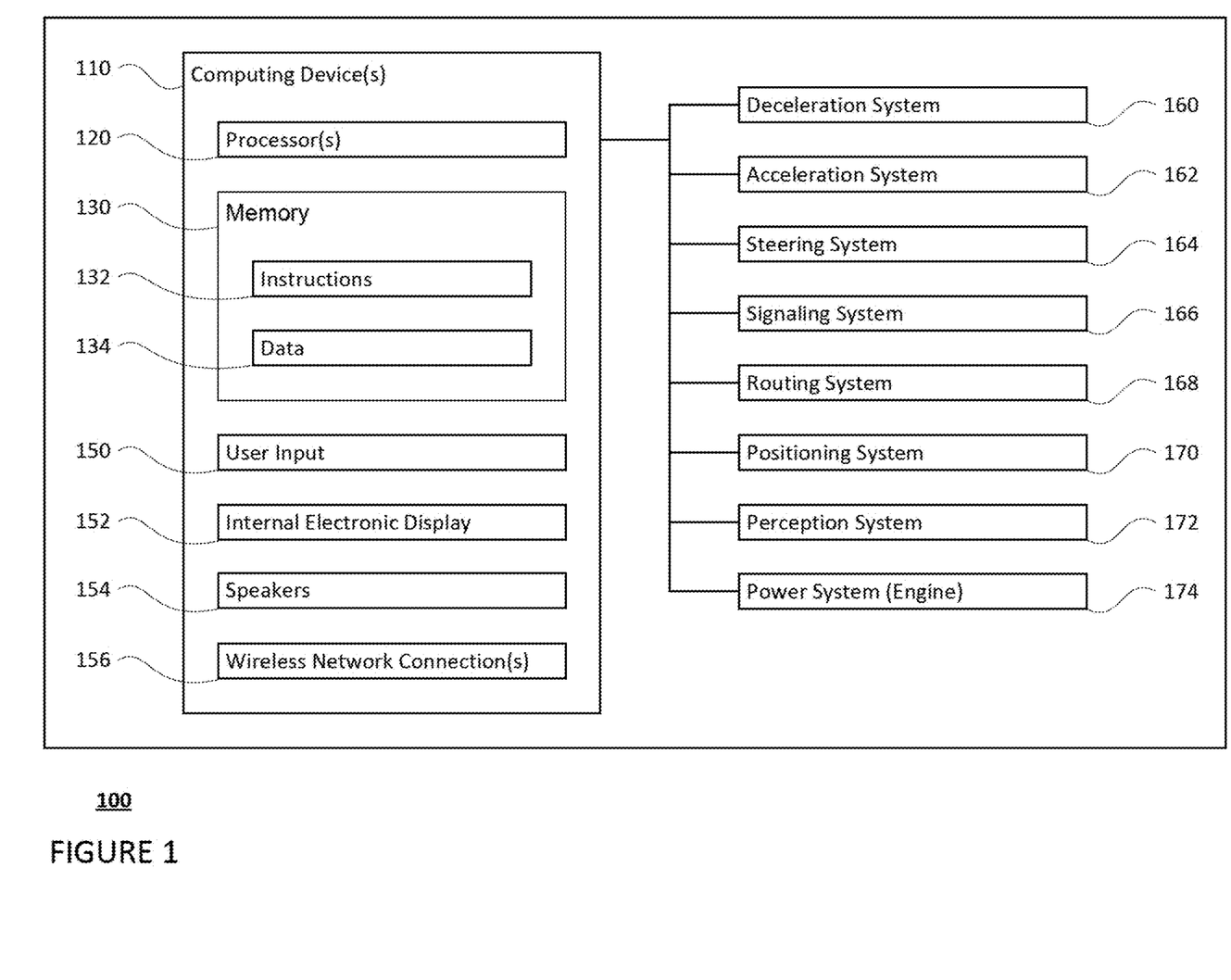
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, Wi-Fi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more imaging sensors including visible-light cameras, thermal imaging systems, laser and radio-frequency detection systems (e.g., LIDAR, RADAR, etc.), sonar devices, microphones, and/or any other detection devices that record data which may be processed by computing devices 110. The sensors of the perception system may detect objects and their characteristics such as location, orientation, size, shape, type, direction and speed of movement, etc. The raw data from the sensors and/or the aforementioned characteristics can be quantified or arranged into a descriptive function or vector and sent for further processing to the computing devices 110. As an example, computing devices 110 may use the positioning system 170 to determine the vehicle's location and perception system 172 to detect and respond to objects when needed to reach the location safely.

Figure 2:
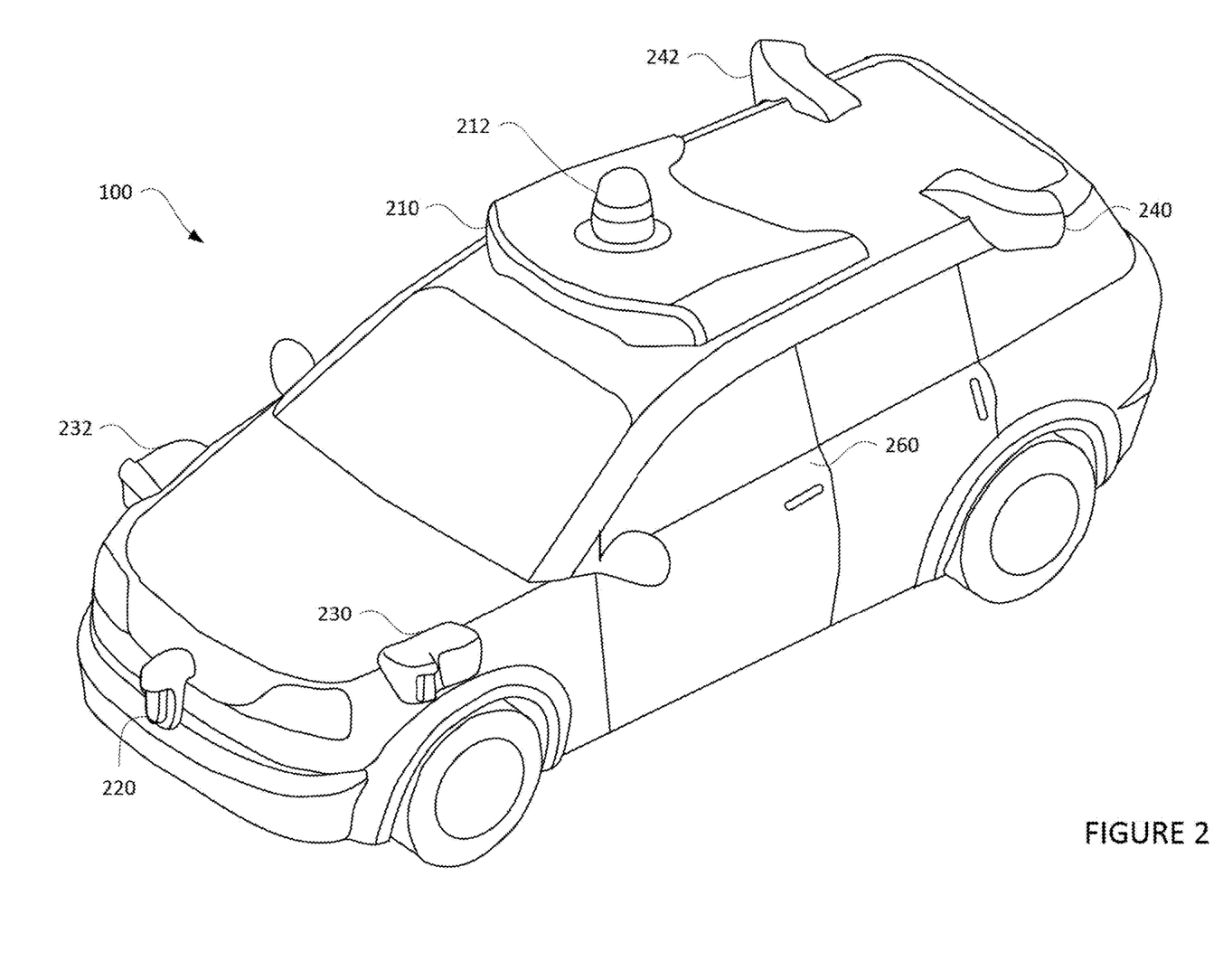
FIG. 2 is an example representative view of a vehicle in accordance with aspects of the disclosure.

FIG. 2 is an example external view of vehicle 100 including aspects of the perception system 172. For instance, roof-top housing 210 and dome housing 212 may include a LIDAR sensor or system as well as various cameras and radar units. In addition, housing 220 located at the front end of vehicle 100 and housings 230, 232 on the driver's and passenger's sides of the vehicle may each store a LIDAR sensor or system. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

Figure 3:
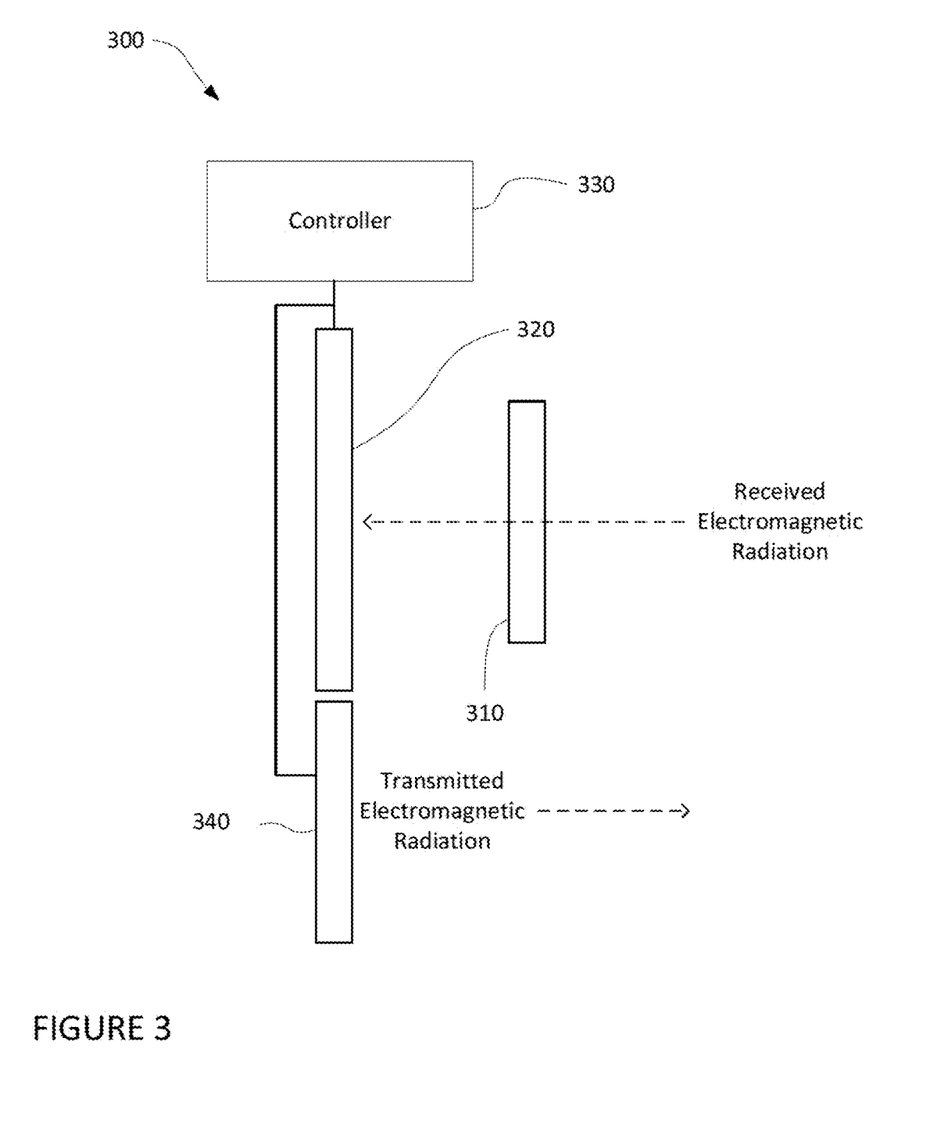
FIG. 3 is an example functional diagram of an imaging sensor in accordance with aspects of the disclosure.

FIG. 3 is an example functional view of an imaging sensor 300 which may be any of the imaging sensors of the perception system 172 or any other imaging sensor. The imaging sensor 300 may include a lens 310 configured to focus received radiation, such as electromagnetic radiation, towards an image sensor 320. The image sensor is attached to a controller 330 which can process information received from the image sensor 320. The controller 330 may include one or more processors, configured similarly to processors 120, which control the operation of the image sensor 320, for instance by setting the gain and exposure time. As the received electromagnetic radiation hits pixels on the image sensor 320, the image sensor 320 may generate sensor data (i.e., image data) representative of the received electromagnetic radiation received by the image sensor 320 over a period of time, typically based on the imaging sensor's exposure time. The controller may be configured to send this sensor data, or rather, the image, to the computing devices, such as computing device 110 for further processing.

The controller 330, or other such processors, may also control an active illumination source 340 for transmitting electromagnetic radiation into the imaging sensor's external environment. The transmitted electromagnetic radiation may reflect off of objects in the imaging sensor's external environment and be received by the image sensor 320 as received electromagnetic radiation. For instance, the imaging sensor 300 may be a camera and the active illumination source 340 may be a flash. In another example, the imaging sensor 300 may be a LIDAR sensor and the active illumination source 340 may be one or more lasers configured to generate a pulse or short burst of light. In yet another example, the imaging sensor 300 may be RADAR and the active illumination source 340 may be one or more transducers configured to generate a pulse or short burst of radio waves.

In some instances, the imaging sensor 300 may receive and/or transmit sound waves in lieu of, or in addition to electromagnetic radiation. In this regard, the active illumination source 340 and image sensor 320 may be replaced or supplemented with one or more transducers. For instance, the imaging sensor 300 may be a sonar sensor configured to transmit and receive sound waves with one or more transducers.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In operation, as received electromagnetic radiation (or sound waves) hit the image sensor 320 (or transducer), an image is captured and sensor data, representative of the image captured, is generated, as further shown in FIG. 3. The sensor data may be encoded by the image sensor 320 and/or controller 330, into an unprocessed and uncompressed image file. These uncompressed and unprocessed image files are typically referred to as raw image files. As raw image files are representative of all the sensor data generated by the image sensor 320 over the total exposure time of the imaging sensor, such as a camera, as it captures an image, the file size of raw image files may be large. For instance, the camera may generate raw image files having a size of around 1 megabyte per megapixel, or more or less.

To reduce the size of raw image files for storage and/or processing, a processor, such as a processor in the imaging sensor or processor 120 of computing device 110, may convert the format of the raw image files into compressed image files. In this regard, the processor may compress the raw image files into a lossy format or lossless format using a lossy compression or a lossless compression algorithm, respectively. A lossy compression algorithm may reduce the size of the resulting image file, but at the expense of irreversibly removing data from the raw image file. For instance, the raw image file may be converted into the lossy JPEG format using the JPEG compression algorithm, which irreversibly removes data to convert the raw image file into a compressed JPEG file. In contrast, a lossless compression algorithm may not reduce the size of the raw image file as much as a lossy compression algorithm, but all of the raw image data may be recovered by reversing the compression.

For instance, the raw image file may be converted into the lossless TIFF format using the TIFF compression algorithm which reversibly removes data to convert the raw image file into a compressed TIFF file. In some instances, more general file compression algorithms, such as DEFLATE, can be used on images generated from a camera or other imaging sensors, such as LIDAR, radar, sonar, etc.

The file size of a compressed image file may be representative of the amount of repeated and/or similar data within the original, raw image file. In this regard, the compression algorithms, either lossy or lossless, may be able to generate a smaller file size in instances where the data contained in the raw image file corresponds to an image having repetitive and/or similar features such as areas having the same or similar colors and/or repeated spatial patterns, than in instances where the data of the raw image file corresponds to an image having irregular and/or dissimilar features. This is because compression algorithms leverage repetition within data to achieve data reduction. As such, data which includes more repetition, such as raw image files corresponding to images having repetitive and/or similar features of an image, may be more compactly compressed than raw image files corresponding to irregular and dissimilar features.

Figure 4A:
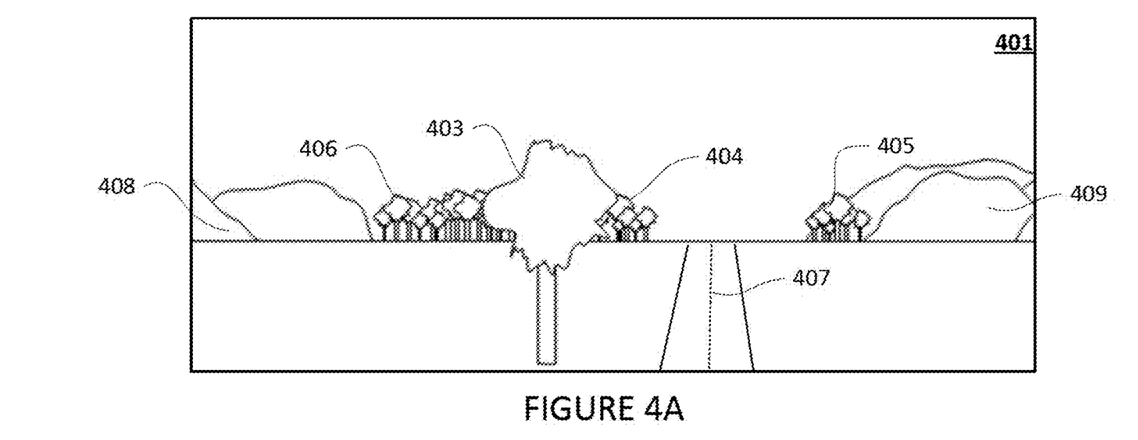
FIGS. 4A and 4B are example images captured by a camera in accordance with aspects of the disclosure.
Figure 4B:
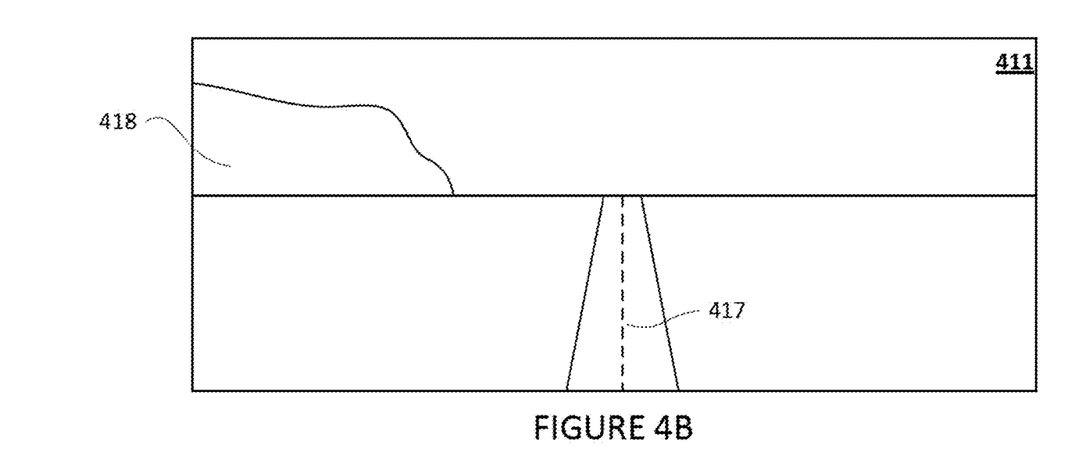

For instance, and as shown in FIG. 4A, data within a raw image file may correspond to an image 401, captured by implemented in this example as a camera, having irregular and dissimilar features such as trees 403-406, a roadway 407, and hills 408, 409. In contrast, and as shown in FIG. 4B, data within a raw image file may correspond to an image 411 captured by the camera having similar and repetitive features, such as a roadway 417 and a single, large hill 418. Compressing the raw image file corresponding to the image 401 shown in FIG. 4A may result in the generation of a compressed JPEG file having a file size of around, for example, a factor of two to five less than the raw image file, or more or less. Compressing the raw image file corresponding to image 411 shown in FIG. 4B may result in the generation of a compressed JPEG file having a smaller file size, such as around, for example, a factor of four to fifteen less than the original raw image, or more or less.

Figure 5:
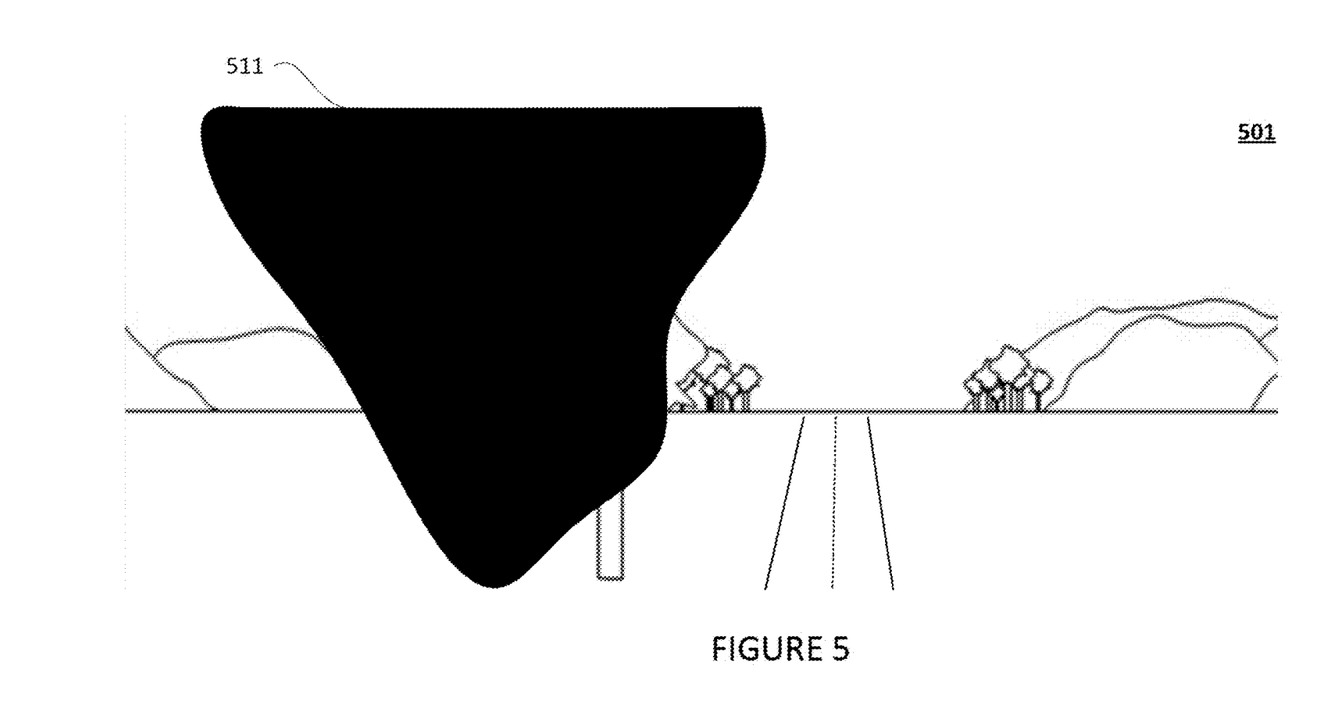
FIG. 5 is example image captured by a camera in accordance with aspects of the disclosure.
Figure 6:
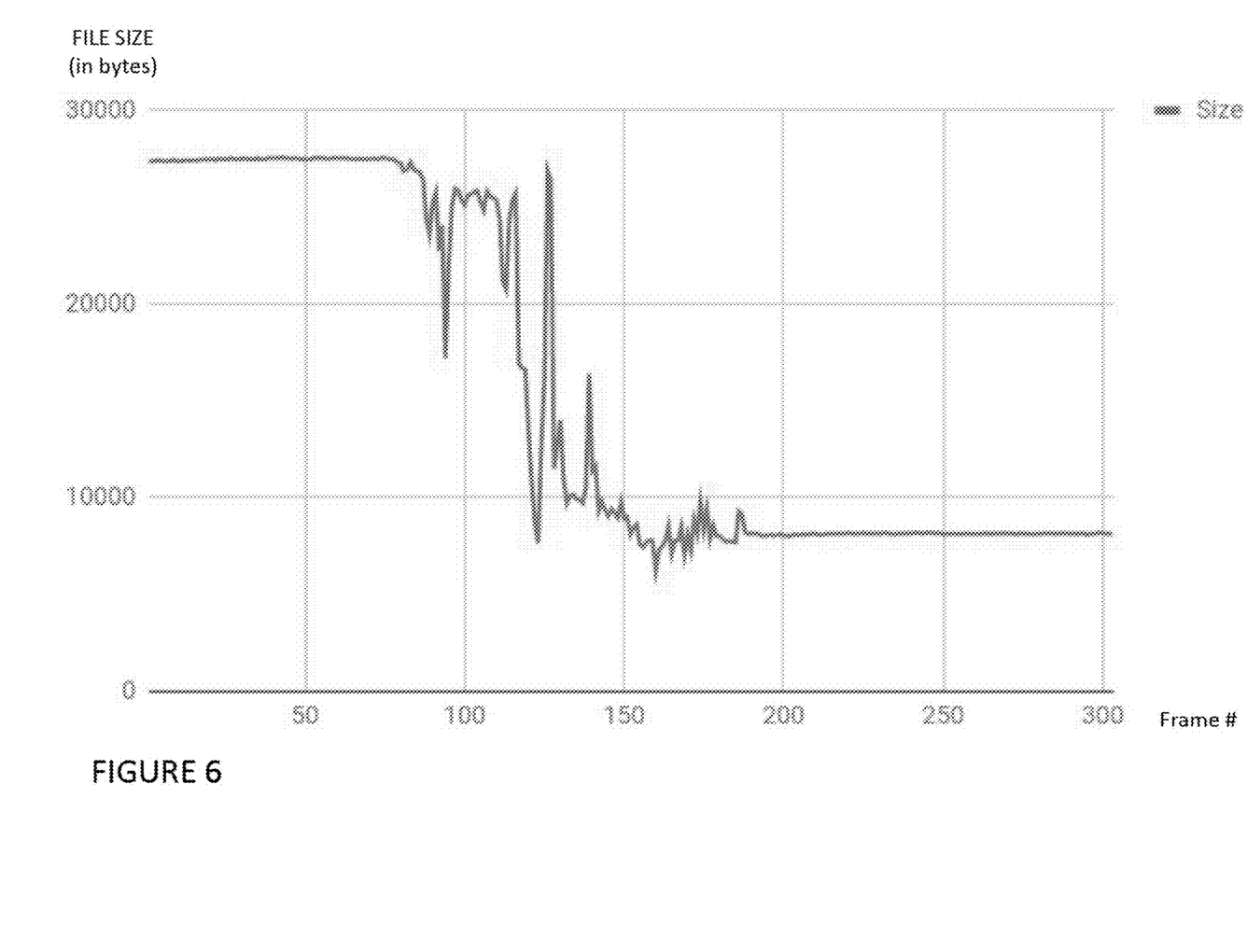
FIG. 6 is an example graphical representation of data in accordance with aspects of the disclosure.

An image which is captured by an occluded imaging sensor 300 may contain one or more areas having a continual dark/blank (i.e., repetitive and similar) feature. For instance, the camera may capture an image 501 having continual dark/blank feature 511, such as shown in FIG. 5. As a result, a compressed image file generated from the raw image file corresponding to the image 501 may be more compact than a compressed image file generated from raw image files corresponding to a similar image not having an occlusion, such as image 401. For instance, and as shown in the graph of FIG. 6, compressed image files corresponding to images captured from a camera without occlusion may be around 27 MB, compressed image files corresponding to images captured when the camera was occluded may be around 9 MB, and compressed image files corresponding to images captured during the time period when the camera was becoming occluded may be some value between 27 MB and 9 MB. As described herein, the file sizes of the compressed image files graphed in FIG. 6 are based on images captured by a single camera. The file sizes of compressed image files captured by other cameras and/or other imaging sensors may be more or less than those shown in FIG. 6.

Figure 7:
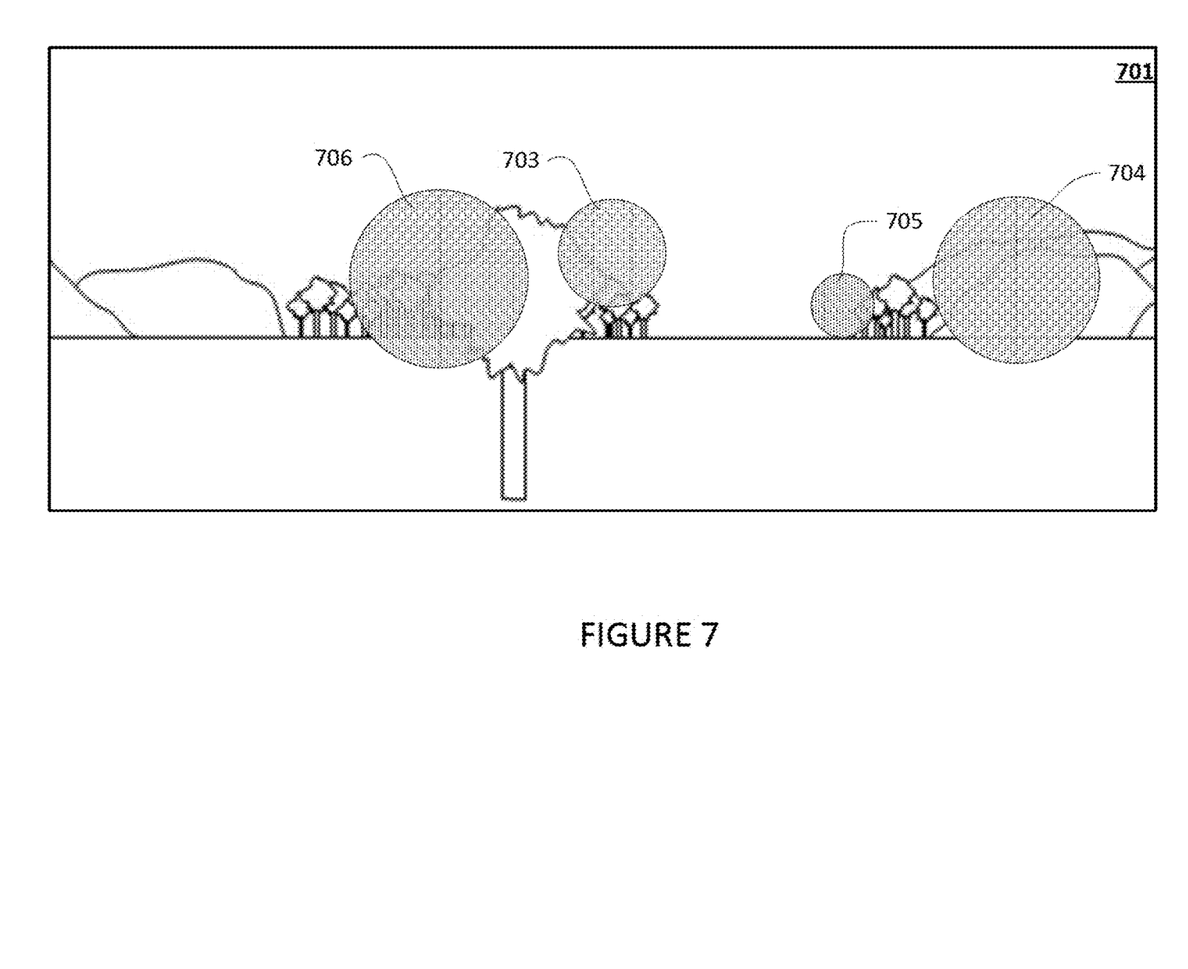
FIG. 7 is example image captured by a camera in accordance with aspects of the disclosure.

Although FIG. 5 illustrates an occlusion 511 which completely, or nearly completely, blocks light from reaching the image sensor of the imaging sensor (i.e., the camera) occlusions may also include other obstructions which block, alter, and/or otherwise obscure light as it reaches and/or passes through an imaging sensor's lens and/or housing. For example, and as illustrated in FIG. 7, occlusions caused by water droplets 703-706 on the lens of an imaging sensor, such as lens 310 of imaging sensor 300, may allow nearly all light to pass through, but may introduce blur over part, or all of the image 701 captured by the imaging sensor. As such, the image captured by the imaging sensor 300, implemented as a camera in the example shown in FIG. 7, may have a loss of spatial information at the locations where the water droplets 703-706 occluded the camera. As a result, the occluded portions of the image may look similar (i.e., have repetitive and similar features).

In order to determine whether an imaging sensor is possibly occluded, the file size of a compressed image file may be compared to a threshold value by one or more computing devices, such as computing device 110. The threshold value may represent a threshold file size. In this regard, compressed image files which have a file size that meets the threshold value (i.e., is smaller than the threshold value) may be identified as possibly being captured by an occluded imaging sensor.

The threshold value may be determined based on an average file size of compressed image files generated by one or more imaging sensors known to not have an occlusion. In this regard, the average file size of compressed image files may be determined in advance of detecting occlusions, such as at vehicle startup or during a calibration period. The average file size of the compressed image files may be stored for later use, such as in memory 130 of computing device 110.

The average file size of compressed image files captured by the one or more imaging sensors known to not have an occlusion, such as one or more of the imaging sensors on the vehicle or one or more imaging sensors on a plurality of vehicles, may be determined by averaging the file size of the compressed image files. The threshold value may be set as the average file size. In some instances, the threshold value may be some value below the average file size, such as within some percentage of the average file size, such as 50%, or more or less. Compressed image files generated by the imaging sensor which fall below the threshold value may be identified as possibly being captured by an occluded imaging sensor. In instances where the average file size is based on images files captured by more than one imaging sensor, the imaging sensors may preferably be the same, or rather, the same make and model. Alternatively, when different imaging sensors are used, the file size of raw image files generated from images captured by the different imaging sensors may be the same or nearly the same to allow for generally accurate threshold values to be determined.

In some instances, the threshold value may be determined based on the size of compressed image files previously generated from images captured by the imaging sensor. In this regard, the file sizes of compressed image files generated from images captured by the imaging sensor may be tracked over a period of time or for a number of frames (e.g., a training period), such as for one minute or 100 frames, or more or less. The smallest file size may be determined from the tracked compressed image files and set as the threshold value. Each newly generated compressed image file generated from an image captured by the imaging sensor may be identified as possibly containing an occlusion if the file size of the newly generated compressed image falls below the smallest file size, or rather, the threshold value.

Alternatively, a running average of the file sizes of compressed image files generated from images captured by an imaging sensor, such as imaging sensor 300, may be used to determine the threshold value. In this regard, the average file size a set of previously compressed image filed generated images captured by the imaging sensor may be determined. The set size of compressed image files may be 100 files, 1,000 files, 10,000 files, etc., or more or less. The threshold value may be based on the average file size of the set, such as within some percentage of the average file size (e.g., within 50% or more or less).

For each image captured by the imaging sensor, such as imaging sensor 300, which satisfies the threshold value, the image may be added to the set and the oldest image may be removed from the set. Each image captured by the imaging sensor which fails to satisfy the threshold value may be identified as possibly containing an occlusion.

The threshold value may also be determined based on historical data including previous images captured by imaging sensors at a similar time of day and/or location a new image is being captured by the imaging sensor. In this regard, a database may store file sizes or average file size for one or more compressed image files in association with locations and/or times of day at which they were captured. The threshold value may be based on the stored average file size or a determination of the average file size of the compressed image files stored in the database. For instance, the file size of a compressed image file generated from an image captured by an imaging sensors, such as image sensor 300, at a first location at a particular time of night may be compared the threshold value based on the stored average file size or a determination of the average file size of the compressed image files stored in the database. In instances where the threshold value is determined based on historical data including previous images captured by imaging sensors at a similar time of day and/or location a new image is captured, the imaging sensors may preferably be the same, or rather, the same make and model as the imaging sensors that possible occlusion is being determined. Alternatively, when different imaging sensors are used, the file size of raw image files generated from images captured by the different imaging sensors may be the same or nearly the same to allow for generally accurate threshold values to be determined for the imaging sensors that possible occlusion is being determined.

In some instances, rather than being a constant, fixed value, the threshold value may be adjusted to avoid generating false positive identifications of possible occlusions. In this regard, if after investigating a possible occlusion it is determined that the imaging sensor or imaging sensors which captured the images having possible occlusions were not occluded at the time the images were captured, the threshold value may be further adjusted to reduce the likelihood of false positives.

In addition to comparing the file size of the compressed image to a suitably chosen threshold value as discussed above, other techniques to determine if the image contains an occlusion based on the compressed file size are also possible. For example, a statistical time-series analysis of the file size could be used to detect anomalous changes in the file size of the compressed images that could correspond to the presence of an occlusion. Such an analysis could rely on examining the slope (derivative, or rather, rate of change) of the file size, whereby a rapid change in the slope could be indicative of occlusion regardless of the actual value of the signal.

Other classes of analyses for determining whether an imaging sensor is occluded may also be possible in conjunction with, or in place of the threshold value determinations discussed herein. As one example, a first-principles or phenomenological model for the file size of the compressed image as a function of time could be used to statistically fit the observed file-size data, where an occlusion is declared whenever a goodness-of-fit statistic passes some threshold value. As another example, machine-learning methods including, but not limited to long short-term memory networks, random decision forests, gradient boosting regressor techniques, and time delay neural networks, may be used directly on the time-series data to detect the presence of an occlusion. Any of the above analyses could also be combined with data from one or more other sensors to aid in the detection of an occlusion.

Once an imaging sensor is determined to possibly be occluded, remedial actions may be taken. For instance, the computing devices 110 may cause the imaging sensor to be cleaned, taken offline, flagged for maintenance, etc. For example, a signal may be sent to activate a cleaning system in order to clean the imaging sensor. As another example, a message may be sent to a human operator indicating that the imaging sensor is occluded. As another example, if the imaging sensor is attached to a vehicle having an autonomous driving mode, such as vehicle 100, the determination may be used by a control system of the vehicle to control the vehicle in the autonomous driving mode for instance, by driving slower and/or discarding information captured by the imaging sensor until the imaging sensor is cleaned or no longer occluded. In another example, the images captured by the potentially occluded imaging sensor may be compared with images captured by another imaging sensor to determine whether the images captured by the two imaging sensors are the same and/or nearly the same. In the event they are the same or nearly the same, the threshold value for detecting possible occlusion may be reduced and/or no further remedial actions may be taken.

Figure 8:
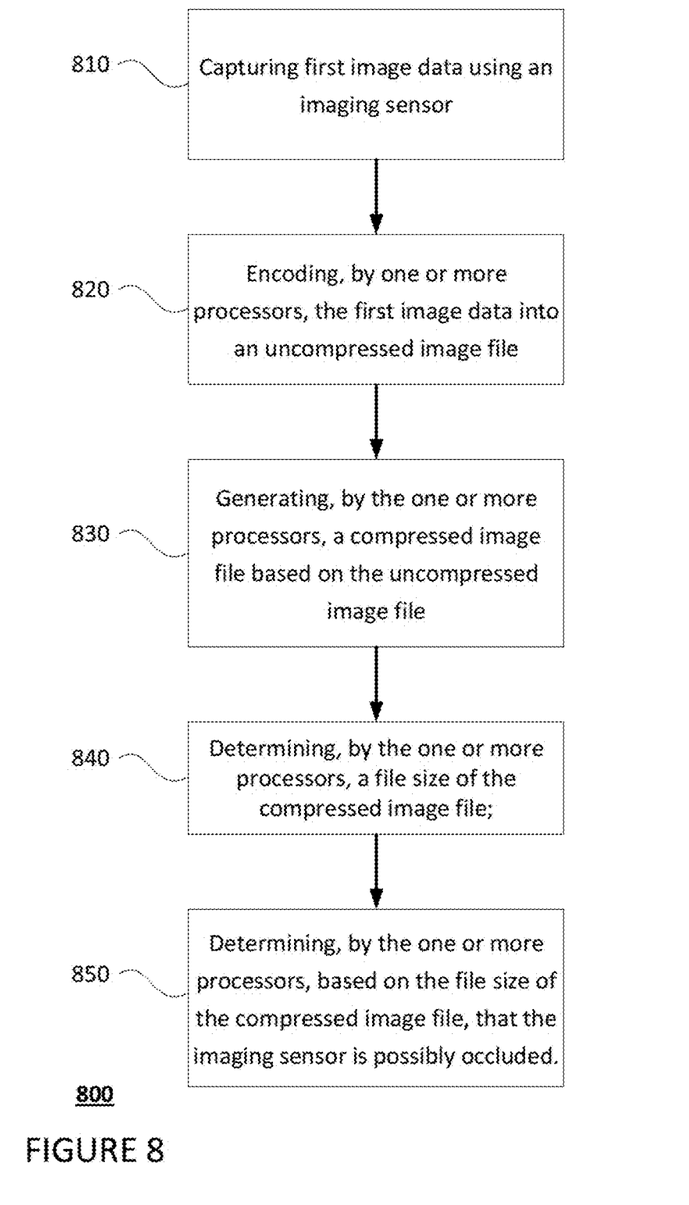
FIG. 8 is an example flow diagram in accordance with aspects of the disclosure.

FIG. 8 is an example flow diagram 800 for determining whether an imaging sensor is occluded in accordance with some of the aspects described herein. The example flow diagram refers to a system including an imaging sensor, such as imaging sensor 300 and one or more computing devices having one or more processors, such as one or more processors 120 of one or more computing devices 110. For instance, at block 810, first image data is captured using the image sensor of the imaging sensor. At block 820, the first image data is encoded into an uncompressed image file. At block 830, a compressed image file is generated based on the uncompressed image file. At block 840, a file size of the compressed image file is determined. At block 850, based on the file size of the compressed image file a determination is made that the imaging sensor is possibly occluded.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of detecting possible imaging sensor occlusion, the method comprising:
   capturing first image data using an imaging sensor;
   encoding, by one or more processors, the first image data into an uncompressed image file;
   generating, by the one or more processors, a compressed image file based on the uncompressed image file;
   determining, by the one or more processors, a file size of the compressed image file; and
   determining, by the one or more processors, based on the file size of the compressed image file, that the imaging sensor is possibly occluded.

2. The method of claim 1, further comprising, comparing the file size of the compressed image file to a threshold file size, and
   wherein determining that the imaging sensor is occluded further includes determining the file size of the compressed image file meets the threshold file size.

3. The method of claim 2, further comprising:
   determining the threshold file size based on an average file size of compressed image files generated by one or more imaging sensors known to not have an occlusion.

4. The method of claim 2, further comprising:
   determining the threshold file size based on the smallest file size of a compressed image captured during a training period by the imaging sensor, wherein the training period corresponds to a predefined number of frames or a predefined time period.

5. The method of claim 2, further comprising:
   determining the threshold file size based on a running average file size of a set of compressed image files generated by the imaging sensor.

6. The method of claim 5, wherein the threshold file size is within a predefined range of the running average file size.

7. The method of claim 2, further comprising:
   determining the threshold file size based on compressed image files corresponding to image data captured at a similar time and/or location of the first image data.

8. The method of claim 2, wherein subsequent to determining that the imaging sensor is occluded, adjusting the threshold file size in response to receiving input that the imaging sensor is not occluded.

9. The method of claim 1, further comprising:
   generating one or more additional compressed image files based on additional image data captured subsequent to the first image data,
   determining a file size of the one or more additional image files, and
   wherein determining the imaging sensor is occluded is further based on the file size of the one or more additional images.

10. The method of claim 9, further comprising determining a rate of change between the file size of the compressed image and the file size of the one or more additional image files,
    wherein determining the imaging sensor is occluded further includes determining the rate of change is below a threshold value.

11. The method of claim 1, further comprising, sending a signal to activate a cleaning system in order to clean the imaging sensor based on the determination that the imaging sensor is occluded.

12. The method of claim 1, wherein the imaging sensor is attached to a vehicle having an autonomous driving mode, and the method further comprises using the determination to control the vehicle in the autonomous driving mode.

13. The method of claim 1, wherein the imaging sensor is a LIDAR sensor, radar unit, or camera.

14. A system for detecting possible imaging sensor occlusion comprising: an imaging sensor; and
one or more processors, wherein the one or more processors are configured to:
capture first image data using the imaging sensor,
encode the first image data into an uncompressed image file,
generate a compressed image file based on the uncompressed image file,
determine a file size of the compressed image file, and
determine based on the file size of the compressed image file, that the imaging sensor is possibly occluded.

15. The system of claim 14, wherein the one or more processors are further configured to compare the file size of the compressed image file to a threshold file size, and
wherein determining that the imaging sensor is occluded further includes determining the file size of the compressed image file meets the threshold file size.

16. The system of claim 15, wherein the one or more processors are further configured to determine the threshold file size based on an average file size of compressed image files generated by one or more imaging sensors known to not have an occlusion.

17. The system of claim 15, wherein the one or more processors are further configured to determine the threshold file size based on the smallest file size of a compressed image captured during a training period by the imaging sensor, wherein the training period corresponds to a predefined number of frames or a predefined time period.

18. The system of claim 15, wherein the one or more processors are further configured to determine the threshold file size based on a running average file size of a set of compressed image files generated by the imaging sensor.

19. The system of claim 15, wherein the one or more processors are further configured to determine the threshold file size based on compressed image files corresponding to image data captured at a similar time and/or location of the first image data.

20. The system of claim 14, wherein the imaging sensor is a LIDAR sensor, RADAR unit, or camera.

* * * * *

UNITED STATES PATENT AND TRADEMARK OFFICE
CERTIFICATE OF CORRECTION

PATENT NO. : 10,867,201 B2  
APPLICATION NO. : 16/248096  
DATED : December 15, 2020  
INVENTOR(S) : Ruffin Evans Page 1 of 1

It is certified that error appears in the above-identified patent and that said Letters Patent is hereby corrected as shown below:

In the Claims

Claim 9  
Column 12, Lines 48 and 49:  
Now reads "the one or more additional image files,"; should read -- the one or more additional compressed image files, --

Claim 9  
Column 12, Lines 51 and 52:  
Now reads "the one or more additional image files,"; should read -- the one or more additional compressed image files, --

Claim 10  
Column 12, Lines 55 and 56:  
Now reads "the one or more additional image files,"; should read -- the one or more additional compressed image files, --

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*